Sept. 14, 1926.

A. L. CHRISTIANSEN

FISH CUTTING AND CLEANING MACHINE

Filed Feb. 26, 1924     4 Sheets-Sheet 1

1,599,807

ANDREW L. CHRISTIANSEN
INVENTOR.

BY Fred H Hayn

ATTORNEY.

Sept. 14, 1926.  
A. L. CHRISTIANSEN  
FISH CUTTING AND CLEANING MACHINE  
Filed Feb. 26, 1924    4 Sheets-Sheet 2

1,599,807

ANDREW L. CHRISTIANSEN  
INVENTOR.

BY *Fred H Hayn*

ATTORNEY.

Sept. 14, 1926.　　　　　　　　　　　　　　　　　　1,599,807
A. L. CHRISTIANSEN
FISH CUTTING AND CLEANING MACHINE
Filed Feb. 26, 1924　　4 Sheets-Sheet 4

ANDREW L. CHRISTIANSEN
INVENTOR.

BY Fred H Hayn

ATTORNEY.

Patented Sept. 14, 1926.

1,599,807

UNITED STATES PATENT OFFICE.

ANDREW LAUNITS CHRISTIANSEN, OF WILMINGTON, CALIFORNIA, ASSIGNOR, BY DIRECT AND MESNE ASSIGNMENTS, OF THIRTY-TWO PER CENT TO EDWIN G. QUAMMA, OF SAN PEDRO, CALIFORNIA, AND OF TWENTY-FOUR PER CENT TO WILLIAM S. LA LONDE, OF LOS ANGELES, CALIFORNIA.

FISH CUTTING AND CLEANING MACHINE.

Application filed February 26, 1924. Serial No. 695,148.

My invention is a novel form of fish cutting and cleaning machine, capable of automatically and efficiently cutting and cleaning fish, without bruising or crushing the same in any way, as is often done when the fish are cut and cleaned by hand. By the use of my invention it is possible to cut and clean fish at a minimum rate of at least 25 lbs. per minute.

My invention also consists in the process of cutting and cleaning fish, which process enables the fish to be cut and cleaned more rapidly and more efficiently than has heretofore been done by any means.

As is well-known, fish must be cut and cleaned within five or six hours after they have been caught, or they will become soft. Cutting and cleaning the fish by hand is not only a slow process, but expensive and inefficient. Moreover, in cutting and cleaning the fish in this manner, the fish are often crushed or bruised, naturally detracting from the salable quality of the fish. By my invention this crushing or bruising is not only avoided, but the fish are cut and cleaned more expeditiously and with a marked saving in expense.

It is an object of my invention to provide a novel form of fish cutting and cleaning machine in which the heads and internal organs of the fish are removed intact, the backbone of the fish merely being severed, back of the gills, the cut being of such a depth that the membrane connecting the head and internal organs of the fish is not touched, both being removed intact.

It is also an object of my invention to provide a means for conveying the fish to a cutter which severs the backbone only, which fish conveying or carrying means, after the backbone of each fish has been cut, carries the fish to a fish head and internal organ remover, which automatically removes the head and internal organs from the fish, said fish carrying or conveying means carrying the fish to the point of discharge of the machine.

It is a further object of my invention to provide a cutter, preferably, though not necessarily, capable of being rotated, which cutter is adapted to be adjusted whereby the depth of the cut may be varied to accommodate fish of different sizes.

It is also an object of my invention to provide a fish conveyor upon which the fish to be cut and cleaned are adapted to be placed, said fish conveyor being equipped with devices that may be adjusted, if desired, for holding the fish in position so that they may be cut and cleaned.

It is also an object of my invention to provide the cleats or devices on the fish conveyor with means for preventing the fish from slipping, such a means, for example, consisting of a sheet metal plate, out of which a series of serrated edges has been pressed.

It is a further object of my invention to provide a means for holding the fish in position longitudinally on the conveyor, which fish holding means is adapted to be adjusted toward and away from said fish conveyor to accommodate fish of various sizes, and also to co-operate with other parts of the machine to hold the fish in position, firmly, but at the same time, lightly, so that they will not be bruised or crushed.

It is also an object of my invention to provide a fish holding means for holding the fish in position transversely, said fish holding means being adapted to be adjusted to accommodate fish of different sizes. Said fish holding means is operated so that the fish are not bruised or crushed.

It is a further object of my invention to provide a holding means for the fish holding means, which holding means are adapted to be adjusted so that said fish holding means may be pressed closer to the fish on the conveyor, or moved away therefrom, as found expedient when the machine is being operated.

It is a further object of my invention to provide angle irons between which the fish conveyor is adapted to travel, the devices or cleats, with which the fish conveyor is provided, being adapted to ride over said angle irons, whereby the movement of said conveyor is made steady.

It is moreover an object of my invention to provide a fish head and internal organ remover, positioned in close proximity to one of said angle irons, which fish head and internal organ remover is adapted to coact with one of said angle irons to whip off the heads and pull out the internal organs, leaving them intact.

It is also an object of my invention to provide a table attached to the frame of my machine, which table is adapted to receive the fish to be cut and cleaned. Moreover, it is within the province of my invention to provide said table with the fish holding means for holding the fish in position longitudinally, above mentioned, which fish holding means may be in the form of an adjustable guide, capable of being adjusted transversely, to insure that the heads of the fish will come in contact with the cutter.

It is also an object of my invention to provide a means for moving the fish holder and the fish conveyor in the same direction, so that the fish on the conveyor may be held firmly but lightly at all times while the machine is in operation, so that the fish may not be bruised or crushed.

It is moreover an object of my invention to provide a set of driving and driven members, mounted upon the frame of the machine whereby, when power is applied, the various parts of my machine may be operated synchronously and in timed relation.

It is also an object of my invention to provide a device which may be inexpensively manufactured, which consists of a minimum number of parts, and which will reduce the cost of cutting and cleaning fish to a degree that has never heretofore been done.

More specifically, it is an object of my invention to provide a process and apparatus in which fish are conveyed forwardly, the backbone of each severed without touching the membrane connecting the head with the internal organs, then passing the fish to a fish head and internal organ remover, whereby the heads of the fish may be removed with the internal organs, leaving them intact, the fish, thus cleaned, passing to the point of discharge.

Further objects and advantages of my invention will become apparent as the description proceeds.

In the drawings, in which like reference characters denote like parts in the various figures.

As hereinbefore stated, fish must be cut and cleaned within five or six hours after they have been caught, or they will become soft. Accordingly, after a large catch of fish it is necessary to employ immediately a large number of persons to cut and clean the fish, which is often a rather difficult task, especially when the fish receipts are intermittent.

By the use of my invention this feature is entirely eliminated, and, as is obvious, a marked saving in the expense involved in cutting and cleaning the fish by hand is obviated.

Figure 12:
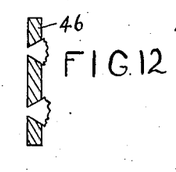
Fig. 12 is a detail cross-section of the fish slipping member.

In the drawings, a frame 1, mounted upon a suitable base, is provided for supporting the various members of my machine. On said frame is mounted an endless belt 3, comprising the fish carrying or conveying member or conveyor, which is used to convey the fish to a cutter 4, which cutter is adapted to sever the backbone of each fish. Said conveyor is preferably made of metal links, hooked together, and which is of such a well-known form that it is not deemed necessary to illustrate the same, and on which are mounted cleats or devices 12, secured to said belt in any desired manner, as, for example, the well-known screw bolt and nut arrangement, not shown. To each cleat is attached a sheet metal plate 46, out of which holes have been punched, as shown in Fig. 12, which holes form serrations that are adapted to take into the tissues of the fish to prevent them from slipping. It is clear, however, other means may be provided for preventing the fish from slipping.

The conveyor 3 embraces two pulleys 23 and 24, which are mounted on the frame of the machine in suitable pillow blocks 26, which may be provided with the usual grease or oil cups, not shown, for keeping the bearings of the pulleys well lubricated. As shown in Figs. 1, 2, 3 and 5, the conveyor 3 passes through a table 2, on which the fish are placed preparatory to cutting and cleaning. Said table is supported in position on the frame 1 by means of longitudinal, transverse and inclined braces, shown clearly in Figs. 1 and 2, and a support 25, which may be made adjustable, if desired.

Figure 6:
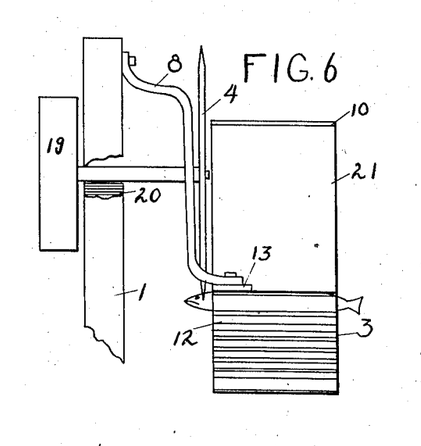
Fig. 6 is a broken, fragmentary detail view showing the cutter severing the backbone of a fish, and also the shims for adjusting the height of the cutter.

To adjust the cutter 4, so that the depth of the cut may be varied, to accommodate fish of different sizes, shims 20, as shown in Fig. 6, are provided. By removing one or more of said shims, or adding others, said cutter may be adjusted as needed.

Figure 16:
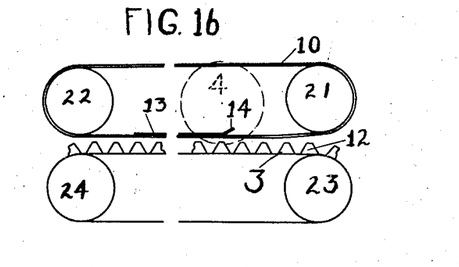
Fig. 16 is a diagrammatic view showing how the fish carrying or conveying member and the fish holding member co-operate to insure that the fish are forced under the cutter.

To hold the fish in position transversely, a fish holding member or belt 10 is provided. Said belt is mounted to travel over pulleys 21 and 22, the pulley 21, as shown in Fig. 16, being positioned at a greater distance from said conveyor 3 at the fish receiving end of the machine than at its discharge end, for a purpose presently to be explained. If desired, means may be provided for adjusting either one or both of said pulleys, so that the distance between said fish holding member and said fish conveyor may be increased or decreased, as may be found desirable in the operation of the machine.

Figure 7:
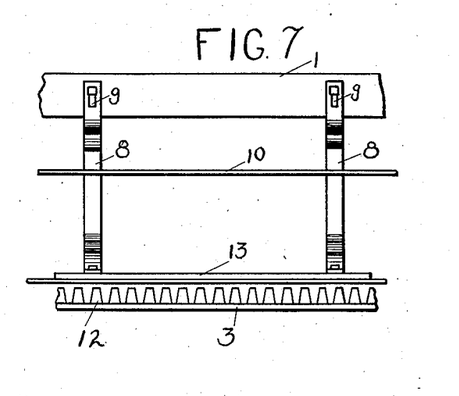
Fig. 7 is a fragmentary detail view showing the adjustable braces for adjusting the fish holding member.

As an additional means for holding the fish in position transversely, a bar 13 for holding said fish holding means in position is provided. Adjustable braces 8, shown in Figs. 6 and 7, firmly hold a bar 13 in position, said bar being bent up or flared as at 14, see Figure 16, for a purpose presently to be explained. The pulleys 21 and 22 are also mounted in pillow blocks 27 and 28, suitable grease or oil cups, not shown, being provided for lubrication.

The fish conveyor 3 is adapted to travel between two angle irons 7, the devices or cleats 12, in operation of the machine, riding over said angle irons, whereby the movement of the conveyor is steadied, as will be clear.

Figure 15:
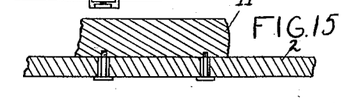

Adjustably mounted on the table 2, is a guide 11, comprising a member for holding the fish in position longitudinally. The manner in which said guide is adjusted is clearly shown in Figs. 14 and 15. Said guide may be adjusted toward or away from the fish, to accommodate fish of different sizes.

Figures 8, 9, 11:
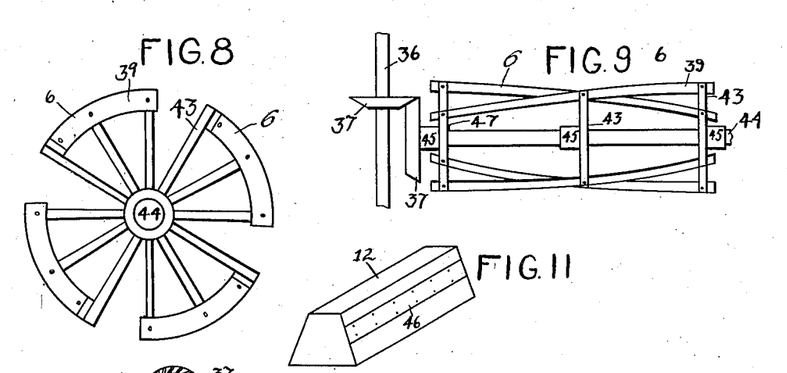
Fig. 8 is a detail elevation of the fan forming a part of the fish head and internal organ remover.
Fig. 9 is a detail elevation of the fan, showing the bevel gears whereby said fan is operated.
Fig. 11 is a detail perspective view of one of the cleats or devices on the fish carrying or conveying member, with the plate used for preventing the fish from slipping.
Figure 10:
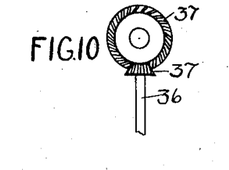
Fig. 10 is a fragmentary detail view showing the bevel gears on the top of the machine for operating the bevel gears shown in Fig. 9.

On a shaft 44, arranged in parallel relation with one of the angle irons 7, a fan 6 is mounted, which fan comprises the active member of the fish head and internal organ remover, said fan being adapted for relative movement and co-operates with the angle iron to remove the heads and internal organs from the fish. The fan 6 comprises a series of spiders 43, mounted on sleeves 45, which sleeves are secured to the shaft 44 in any desired manner. Warped blades 39 are mounted on the spiders 43, as shown in Figs. 8 and 9. The spiders 43 are arranged out of alinement, as shown in Fig. 8, and the blades are placed at such an angle with the length of the shaft 44, that, in operation, it will be impossible for the spiders 43 to mutilate, bruise or crush the fish. In practice, I have found that such an angle approximates 45 degrees. The shaft 44 being rotated in the manner hereinafter more fully explained, the fan 6, co-operating with the angle iron 7, whips off the head of each fish, as the conveyor carries the fish to said head and internal organ remover, the internal organs being pulled out with the head, leaving them intact.

Means are provided for operating the various parts of my machine automatically and in timed relation. A shaft 16, constituting the first driven member, is rotated by the driving member 15, suitably mounted thereon, said driving member consisting preferably of a pulley, which pulley is adapted to be operated by a motor, such, for example, a gas engine, electric motor, or any other means found desirable.

Also mounted on the shaft 16 is a pulley 17, which pulley is adapted to operate another pulley 19, of a smaller size, adapted to operate the cutter 4, at an increased speed. I have found in practice that a speed of 1700 R. P. M. of the driving member 15 is desirable. The belt 33, embracing the pulleys 17 and 19, causes the pulley 19 to be rotated by the pulley 17. It is, of course, clear that other means for transmitting the rotary movement of the shaft 16 to the cutter 4 may be utilized, and I am not limited to the precise structure shown.

Figure 1:
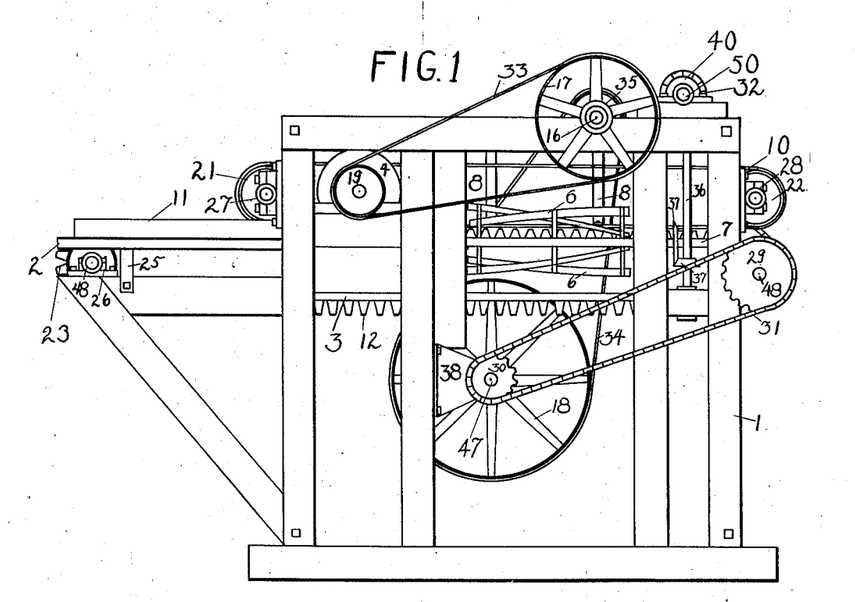
Fig. 1 is a side elevation of my invention.
Figure 2:
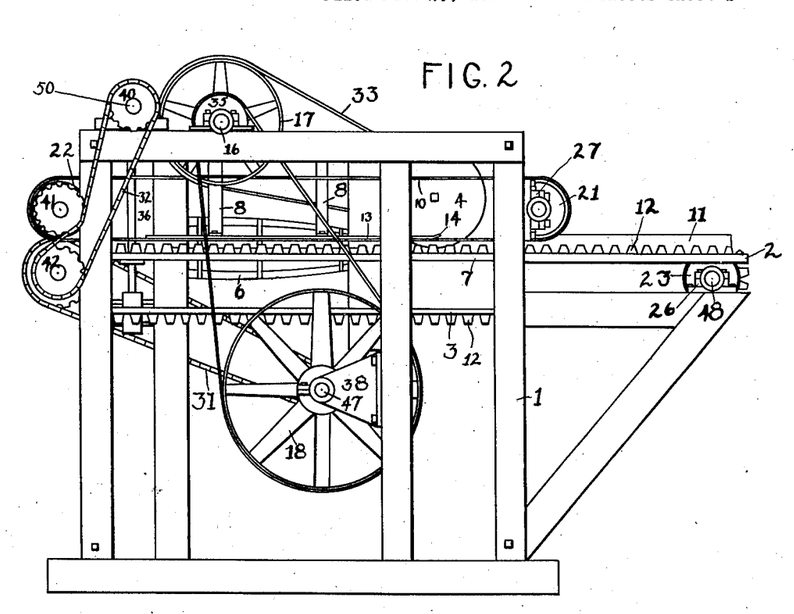
Fig. 2 is a side elevation of my machine, opposite to that shown in Fig. 1.
Figure 3:
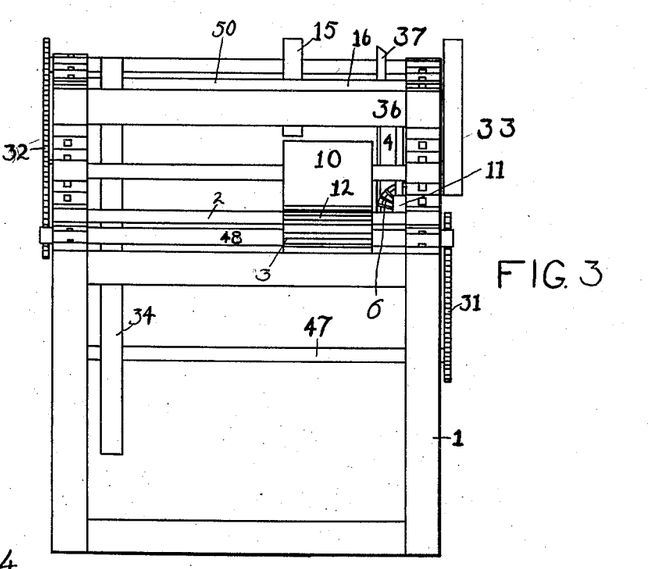
Fig. 3 is a front elevation of the fish cutting and cleaning machine.
Figure 4:
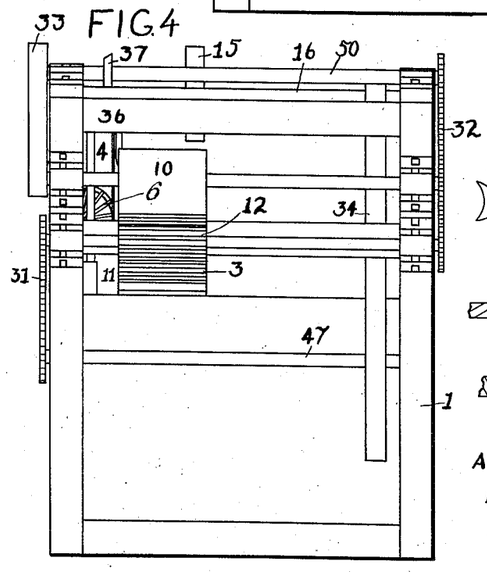
Fig. 4 is a rear elevation thereof.
Figure 5:
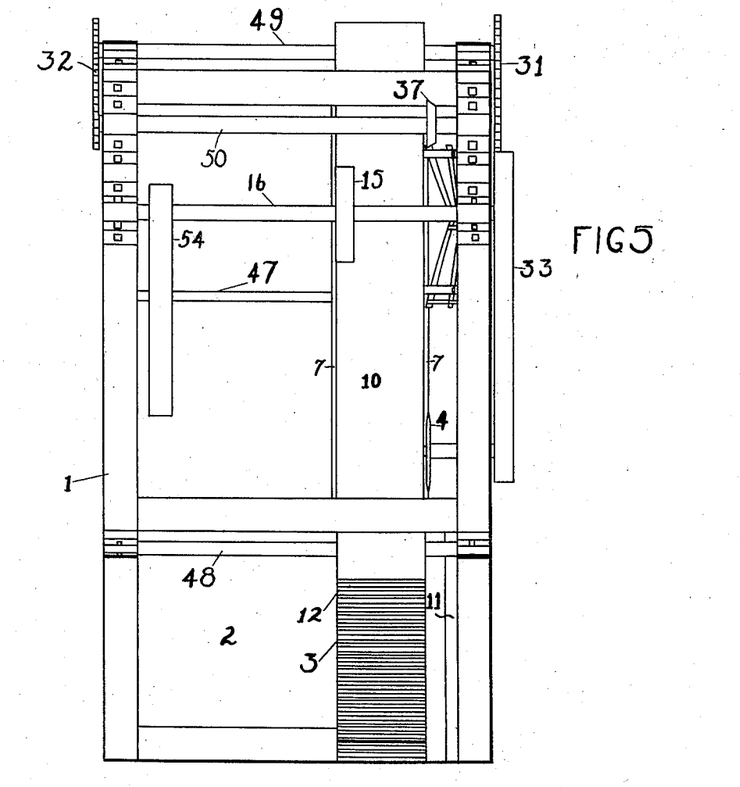
Fig. 5 is a top plan.

The fish conveyor 3 is driven by the shaft 16 by means of a pulley 35 mounted thereon. The rotary movement of said pulley 35 is transmitted to a pulley 18, of a larger size than said pulley 35, by means of a belt 34, whereby a reduction in speed is obtained. The pulley 18 is mounted on a shaft 47, which shaft in turn is mounted for rotation in standards or supports 38, secured to the frame 1, as shown in Figs. 1 and 2. If desired, the standards or supports 38 may be lubricated in the manner hereinbefore explained.

Secured to and rotated with the pulley 18, is a sprocket wheel 30, which wheel is adapted to transmit power to another similar wheel 29 by means of the chain 31. The wheel 29 is mounted on and is adapted to rotate with the shaft 48 on which is keyed the pulley 23, which pulley drives the fish conveyor 3.

Means are provided whereby the fish holding member or belt 10 may be moved in the same direction, and approximately at the same speed as the fish conveyor 3. This means comprises a set of sprocket wheels 40, 41, and 42—see Fig. 2—suitably mounted on shafts moving in pillow blocks or bearings mounted on the frame 1, motion being transmitted by means of the chain 32. The shaft on which the wheel 42 is mounted being rotated by the chain 31 from the wheel 30, is rotated counter-clockwise; the chain 32 also rotates the wheel 40 counter-clockwise, which chain in turn rotates the wheel 41 in a clockwise direction, causing the fish holding member or belt 10 to move in the same direction as the fish conveyor 3.

A shaft 36, shown in Figs. 1, 2, 9 and 10, is mounted vertically on the frame 1, as shown in Figs. 1 and 2. A set of bevel gears 37, mounted on the shafts 50, 36 and 44, transmit motion from the driving member 15 to the fan 6, which fan is adapted to rotate at a speed approximately of 30 R. P. M.

Figures 13, 14:
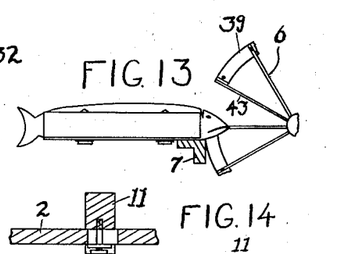
Fig. 13 is a fragmentary detail view illustrating how the fan and angle iron coact to remove the heads and internal organs from the fish.
Figs. 14 and 15 are fragmentary detail sectional views disclosing the means for adjusting the guide whereby the fish are held transversely.

In practice the fish holding member or belt 10 and the fish conveyor move at an approximate speed of 3 complete turns per minute. The fish are held absolutely immovable, without slipping, and are cut by the cutter 4 without bruising or crushing in any way. The blades of the fan 6 travel close to the angle iron 7, as shown in Fig. 13, and efficiently and quickly remove the heads and internal organs from each fish as the conveyor 3 conducts them to said fan. In practice, as high as 32 lbs. of fish have been cut in one minute, though this number is varied, depending upon the kind of fish cut and cleaned and their condition. It has been found that fully 95% of the fish on the market can be cut and cleaned by my machine.

The first driven member is designated by the numeral 16; the second driven member is denoted by the numeral 22, which member is the pulley driving the belt or fish holding member 10; the third driven member is the shaft 50, and the fourth driven member is the vertical shaft 36.

The pulley 21 is positioned at a greater distance from the pulley 23, at the fish receiving end of the machine, than the pulley 22 is positioned from the pulley 24, at the fish discharge end of the machine. See Fig. 16. This feature permits the fish to be forced under the cutter 4, without bruising or crushing, as often happens when the fish are cut by hand. The cutter is rotated toward the oncoming fish, and the backbones of two or more fish are severed at one time.

The bar 13 is bent or flared at 14 to allow the belt or fish holding member 10 to be raised by the oncoming fish so that it will insure that the fish pass under the cutter.

Means, not shown, are provided whereby the fish conveyor may be removed and others, bearing cleats of a different size, to accommodate fish of different sizes, may be substituted. To do this all that is necessary is to uncouple the ends of the conveyor by unhooking the hook and eye arrangement of the links of the conveyor, which may be done in a very few moments, as will be clear. This is such an obvious proceeding that it is not deemed necessary to show the same.

The operation of the machine will now be clear. The operator applies power to the driving member 15, and the various pulleys and wheels are set in motion, the conveyor and fish holding member moving forward slowly away from the operator. The fish are then placed in parallel relation between the cleats on the conveyor, which carries them under the cutter 4, where, as above explained, they are cut down through the backbone but not touching the membrane that connects the head with the internal organs. The cutter, rotating toward the oncoming fish, cuts two or more at a time, the fish holding member holding the fish firmly in position without bruising or crushing. See Fig. 6. The cut fish are then moved on by the conveyor, and are carried to the fan 6, the blades of which, rotating toward the angle iron 7, as shown in Fig. 13, whip off the heads and at the same time pull out with them the internal organs, which are dropped intact into a pan, not shown, placed below the machine. The headless and cleaned fish are then conveyed to the end of the machine, where they are dropped off into a similar receptacle, not shown.

It is, of course, understood that my invention, as shown and described, may be varied through a wide range, and I do not propose to limit myself to the precise structure shown and described, and modifications thereof may be made within the scope of the appended claims.

I claim:

1. In a fish cutting and cleaning machine, a driving member, driven members operated thereby, a fish carrying member operated by one of said driven members, means for severing the backbone of each fish, said means being operated directly by said driving member, means for adjusting the depth of the cut made in each fish, whereby fish of various sizes may be cut and cleaned, fish holding means operated by another of said driven members, whereby the fish may be held firmly in position to be cut without bruising or crushing, said fish holding means being adapted to travel close to and in the same direction as said fish conveying means, and a fish head and internal organ remover, operated by still another of said driven members, whereby the heads and internal organs of the fish may be removed intact, substantially as described.

2. In a fish cutting and cleaning machine, driving and driven members, fish carrying means operated by one of said driven members, a fish cutter, means for operating said fish cutter, a fish holding means operated by another of said driven members, whereby the fish may be held firmly in position, but without bruising or crushing the same, said fish holding means being so positioned relative to said fish carrying means that the fish are forced into contact with said cutter, without bruising or crushing, and a fish head and internal organ remover operated by still another of said driven members, whereby the heads and internal organs of the fish may be removed intact, substantially as described.

3. In a fish cutting and cleaning machine, driving and driven members, fish carrying means operated by one of said members, a fish cutter also operated by one of said members, fish holding means for insuring that each fish is held in position to be cut and cleaned, and not bruished or crushed, said fish holding means comprising a belt adapted to be operated by one of said members and travel closely to said fish carrying means, said belt being at a greater distance from said fish carrying means at the fish receiving end of said machine than at the fish discharge end, whereby said fish are compelled to be cut by said cutter without crushing or bruising, and a fish head and internal organ remover operated by another of said members, whereby the heads and internal organs of said fish may be removed, substantially as described.

4. In a fish cutting and cleaning machine, a frame, driving and driven members mounted thereon, a rotary fish cutter driven by one of said members, a fish conveyor also operated by one of said members, said fish conveyor comprising a movable, endless belt, devices mounted upon said belt for holding the fish to be cleaned and cut, means whereby said belt may be removed from said machine, so that other belts may be substituted, to accommodate fish of different sizes, a fish holding means adapted to cooperate with said fish conveyor to hold the fish in position so that they may be cut without bruising or crushing, and a fish head and internal organ remover for removing the heads and internal organs of the fish, substantially as described.

5. In a fish cutting and cleaning machine, a frame, driving and driven members mounted thereon, a fish cutter adapted to be driven by one of said members, a fish conveyor also adapted to be moved by one of said members, a fish head and internal organ remover also adapted to be moved by one of said members, a fish holding means adapted to co-operate with said fish conveyor to retain the fish in position to be cut and insure that said fish head and internal organ remover does not bruise or crush said fish, means for moving said fish holding means in the same direction as said fish conveyor, said means comprising a driving member for said fish holding means, two driven members operated by one of said first mentioned members, and means for mutually moving said last three members substantially as described.

6. In a fish cutting and cleaning machine, a frame, driving and driven members mounted thereon, a table for receiving the fish to be cut and cleaned, a fish cutter adapted to sever the backbone of each fish, a fish head and internal organ remover, a fish conveyor for receiving the fish, carrying them to the cutter to be cut, thence to said fish head and internal organ remover, and conveying the headless and cleaned fish to the point of discharge, said driving and driven members coacting for synchronous movement of said fish cutter, conveyor and fish head and internal organ remover, an adjustable guide mounted upon said table for holding the fish in position longitudinally, angle irons positioned on each side of said fish conveyor for steadying the movement of the same, devices on said fish conveyor for holding the fish in position to be cut and cleaned, said devices being adapted to ride over said angle irons, a fish holder for retaining the fish in position transversely on said fish conveyor, and adjustable means for holding said fish holder in position, substantially as described.

7. In combination, an automatic fish cutting and cleaning machine, a conveyor for carrying fish, means for operating said conveyor, a cutter for severing the backbone of each fish, means for operating said cutter, fish holding means for retaining the fish in position so they may be cut and cleaned, means for holding said fish holding means in position, said last named means being provided with a part adapted to force the fish under said cutter, without bruising or crushing the fish, and means for automatically removing the heads and internal organs from the fish, substantially as described.

8. In combination, an automatic fish cutting and cleaning machine, a conveyor for carrying fish, means for operating said conveyor, means for severing the backbone of each fish, fish holding means for retaining the fish in position on said conveyor, a bar for holding said fish holding means close to said conveyor, means for adjusting said bar to accommodate fish of different sizes, said bar being provided with a flared end, arranged in proximity to said means for severing the backbone of each fish, whereby the fish are forced under said means for severing the backbone of each fish, without bruising or crushing the same, and means for removing the heads and internal organs from each fish, substantially as described.

9. In a fish cutting and cleaning machine, a cutter for severing the backbone of each fish, means for operating said cutter, a fish conveyor adapted to carry the fish to said cutter, means for operating said conveyor, blocks mounted on the conveyor for receiving fish therebetween and having serrated faces to grip the fish whereby the fish are prevented from slipping, a fish head and internal organ remover for removing the heads and internal organs from each fish, and means for operating said fish head and internal organ remover, substantially as described.

10. In a fish cutting and cleaning machine, means for severing the backbone of each fish to be cut and cleaned, means for conveying the fish to said first mentioned means, devices on said second mentioned means whereby the fish are held in position and prevented from slipping, means adapted to be rotated longitudinally toward said fish for removing the heads and internal organs from each fish, and means for operating each of said means in timed relation, substantially as described.

11. In combination, a fish cutting and cleaning machine, a cutter on said machine for severing the backbone of each fish, means for operating said cutter, a fish conveyor adapted to carry fish to said cutter, means for operating said fish conveyor, devices on said fish conveyor for keeping the fish in alignment so they may be cut and cleaned, an element on each of said devices whereby the fish are prevented from slipping, means for holding the fish longitudinally, means for holding the fish transversely, a fish head and internal organ remover, and means for operating said fish head and internal organ remover whereby the heads and internal organs of each fish are removed intact, substantially as described.

12. In combination, a fish cutting and cleaning machine, means on said machine for severing the backbone of each fish to be cut and cleaned, means for conveying the fish to said first mentioned means, devices on said second mentioned means whereby the fish are held in position to be cut and cleaned, elements on each of said devices for preventing the fish from slipping, additional devices for steadying the movement of said second mentioned means, means for removing the heads and internal organs of each fish, and means for operating each of said means in timed relation, substantially as described.

13. In combination, a fish cutting and cleaning machine, a movable cutter mounted thereon, means for moving said cutter, fish conveying means movable longitudinally for bringing the fish into contact with said cutter, means for moving said fish conveying means, movable fish holding means, and means movable toward said fish longitudinally for removing the heads and internal organs from each fish, all of said means being adapted for synchronous movement, substantially as described.

14. In combination, a fish cutting and cleaning machine, a frame, a cutter mounted on said frame, a fish conveyor mounted on said frame in juxtaposition with said cutter, a guide secured to said frame for keeping the fish in alignment on said fish conveyor, means for moving said conveyor so that each fish is selectively and automatically brought into contact with said cutter, fish holding means mounted for movement on said frame, said fish holding means in addition to said guide being adapted to insure that each fish is automatically and selectively brought into contact with said cutter, and means for automatically removing the heads and internal organs from each fish, substantially as described.

15. In combination, a fish cutting and cleaning machine, a frame, a table associated therewith for receiving the fish to be cut and cleaned, a fish conveyor mounted for movement on said frame, said fish conveyor being adapted to be automatically moved in juxtaposition with said table, fish cutting means mounted on said frame in proximity with said fish conveyor, a guide on said table for keeping the fish in alignment, fish holding means on said frame adapted to hold the fish in position, means for holding said fish holding means in position, adjustable means for tightening or loosening said fish holding means, and means for removing the heads and internal organs from each fish, substantially as described.

16. In a fish cutting and cleaning machine, a head and internal organ remover comprising a shaft, a series of spiders on said shaft, and warped blades mounted on said spiders, substantially as described.

17. In a fish cutting and cleaning machine, a fish head and internal organ remover comprising a shaft, spiders mounted upon said shaft, and elements secured to said spiders for removing the heads and internal organs from fish, substantially as described and for the purpose set forth.

18. In a fish cutting and cleaning machine, a fish head and internal organ remover consisting of an angle iron, a fan mounted in close relation with said angle iron, said fan comprising a shaft arranged in parallel relation with said angle iron, spiders mounted on said shaft, warped blades secured to said spiders, said blades being positioned at an angle of approximately forty-five degrees with the length of said shaft, whereby the fish, when brought into contact with said fish head and internal organ remover, said fish are prevented from being crushed and bruised by said spiders, substantially as described.

19. In a fish cutting and cleaning machine, a fish head and internal organ remover consisting of an angle iron, a fan mounted in close relation thereto, said fan comprising a shaft arranged in parallel relation with said angle iron, spiders mounted at intervals on said shaft, blades secured to said spiders, said blades being positioned at such an angle that the fish, when brought into contact with said fish head and internal organ remover, are prevented from being crushed or bruised by said spiders, substantially as described.

20. In combination, an automatic fish cutter and cleaner, a conveyor for carrying fish, means for operating said conveyor, fish holding means for retaining said fish in position transversely, guiding means for holding said fish in position longitudinally, a cutter for severing the backbone of each fish, means for operating said cutter, and means for simultaneously whipping, intact, the heads and internal organs from each fish, substantially as described.

21. In combination, an automatic fish cutter and cleaner, a conveyor for carrying fish, means for operating said conveyor, fish holding means for retaining said fish in position transversely, adjustable guiding means for holding said fish in position longitudinally, a cutter for severing the backbone of each fish, means for operating said cutter, and means for simultaneously whipping, intact, the heads and internal organs from each fish, substantially as described.

22. In combination, an automatic fish cutter and cleaner, a conveyor for carrying fish, means for operating said conveyor, fish holding means for retaining said fish in position transversely, elements for holding said fish holding means in position, adjustable guiding means for holding said fish in position longitudinally, a cutter for severing the backbone of each fish, means for operating said cutter, and means for simultaneously whipping, intact, the heads and internal organs from each fish, substantially as described.

23. In combination, an automatic fish cutter and cleaner, a conveyor for carrying fish, fish holding means for retaining said fish in position transversely, adjustable elements for holding said fish holding means in position, adjustable guiding means for holding said fish in position longitudinally, a cutter for severing the backbone of each fish, means for operating said cutter, and means for simultaneously whipping, intact, the heads and internal organs from each fish, substantially as described.

24. In combination, an automatic fish cutter and cleaner, a conveyor for carrying fish, fish holding means for retaining said fish in position transversely, adjustable elements for holding said fish holding means in position, adjustable guiding means for holding said fish in position longitudinally, an adjustable cutter for severing the backbone of each fish, means for operating said cutter, and means for simultaneously whipping, intact, the heads and internal organs from each fish, substantially as described.

25. In combination, an automatic fish cutter and cleaner, means for carrying the fish to be cut and cleaned, said means being provided with devices for holding the fish in parallel relation, fish holding means for retaining the fish in position transversely, adjustable elements for holding the fish holding means in position, adjustable guiding means for holding the fish in position longitudinally, and adjustable cutter for severing the backbone of each fish, but without touching the membrane that connects the head with the internal organs, means for operating said cutter, and means for simultaneously whipping, intact, the heads and internal organs from each fish, substantially as described.

26. In combination, an automatic fish cutting and cleaning machine, a driving member, driven members operated thereby, a fish cutter operated by said driving member at an increased speed, a fish carrying member operated by one of said driven members at a speed less than that of said driving member, a fish holding member operated by another of said driven members at a speed approximately that of said fish carrying member, angle irons between which said fish carrying member is adapted to travel for rendering the movement of said fish carrying member steady, and a fish head and internal organ remover positioned in close relation with one of said angle irons, said fish head and internal organ remover being adapted to be operated by still another of said driven members at a speed less than that of said driving member, whereby the heads and internal organs of each fish may be removed intact, substantially as described.

27. In combination, an automatic fish cutting and cleaning machine, a frame, a driving member mounted on said frame, a first driven member operated by said driving member, a fish carrying member operated by said first driven member, means operated by said driving member for moving said fish carrying member at a reduced speed, a fish cutter operated by said driving member at an increased speed, a fish holding member adapted to co-operate with said fish carrying member to hold the fish so they may be cut and cleaned, a second driven member for operating said fish holding member, means for operating said second driven member by said driving member at a speed approximately that of said fish carrying member, devices for moving said fish holding member in the same direction as said fish carrying member, a shaft mounted on said frame, an angle iron mounted on said frame in parallel relation with said shaft, a fan mounted on said shaft, said angle iron and said fan comprising a fish head and internal organ remover, a third driven member also operated by said first driven member, a fourth driven member operated by said third driven member, and devices mounted upon said third and fourth driven members for driving said fan, whereby the heads and internal organs of each fish may be removed intact, substantially as described.

ANDREW LAUNITS CHRISTIANSEN.